United States Patent [19]
Kubo

[11] Patent Number: 5,601,909
[45] Date of Patent: Feb. 11, 1997

[54] PERMANENT ELECTRODE CARRIER USING TOURMALINE

[76] Inventor: Tetsujiro Kubo, 408, 2-chome, 5-12, Shibuya, Shibuy-ku, Tokyo 150, Japan

[21] Appl. No.: 569,051

[22] Filed: Dec. 7, 1995

Related U.S. Application Data

[63] Continuation of Ser. No. 162,326, Dec. 7, 1993, abandoned.

[51] Int. Cl.$^6$ .................................................. B32B 5/16
[52] U.S. Cl. ........................... 442/417; 428/323; 428/372; 428/402
[58] Field of Search ................................ 428/323, 283, 428/372, 402

[56] References Cited

U.S. PATENT DOCUMENTS

| | | | |
|---|---|---|---|
| 3,561,599 | 2/1971 | Sheen | 210/198.3 |
| 3,678,933 | 7/1972 | Moore et al. | 128/296 |
| 3,748,548 | 7/1973 | Haisty et al. | 257/523 |
| 3,975,257 | 8/1976 | Hulse | 204/150 |
| 3,983,868 | 10/1976 | Ring | 128/263 |
| 4,003,252 | 1/1977 | Dewath | 73/861.27 |
| 4,135,039 | 1/1979 | Jenkins | 429/27 |
| 4,195,634 | 4/1980 | DiSalvo et al. | 128/290 R |
| 4,236,987 | 12/1980 | Schlindler et al. | 204/417 |
| 4,320,184 | 3/1982 | Bernstein | 429/217 |
| 4,406,793 | 9/1983 | Kruyer | 210/693 |
| 4,706,320 | 11/1987 | Swift | 15/1.5 R |
| 4,778,740 | 10/1988 | Takashima et al. | 430/42 |
| 4,864,228 | 9/1989 | Richardson | 324/158 R |
| 4,903,634 | 2/1990 | Ono et al. | 118/653 |
| 4,904,394 | 2/1990 | Clarke et al. | 210/748 |
| 4,952,321 | 8/1990 | Bradshaw et al. | 210/679 |
| 5,108,618 | 4/1992 | Hirasawa | 210/689 |
| 5,137,930 | 8/1992 | Soukup | 521/99 |
| 5,245,386 | 9/1993 | Asano et al. | 355/219 |
| 5,531,869 | 7/1996 | Hubo | 502/202 |

FOREIGN PATENT DOCUMENTS

| | | | |
|---|---|---|---|
| 0444815 | 2/1991 | European Pat. Off. | |
| 3523440 | 1/1987 | Germany | 359/87 |
| 4317662 | 9/1992 | Japan . | |

OTHER PUBLICATIONS

Markus, Electronics Dictionary, Fourth Edition, 1978, pp. 21 and 588–589.
New Technology Japan, vol. 18, No. 9, "Legionella Contamination Prevention for Cooling Systems", Dec. 1990.
Solid State Physics, vol. 24, No. 12, "Interface Activity of Water Given Rise to by Tourmaline", T. Kubo, Dec. 1989.
Nippon Shokuhin Kogyo Gakkaishi, vol. 38, No. 5, pp. 422–424, 1991.
Flowlet Water Activator, Product Brochure (English translation), publication date Jun. 1989 ("Brochure No. 1").
Flowlet Water Activator, Product Brochure (English translation), exact publication date unknown but sometime between Feb. to Jun. 1990 ("Brochure No. 2").
Flowlet Water Activator, Product Brochure (English translation), publication date May 1992 ("Brochure No. 3").

*Primary Examiner*—James J. Bell
*Attorney, Agent, or Firm*—Wenderoth, Lind & Ponack

[57] ABSTRACT

A carrier having a suitable degree of electrical conductivity is provided for fine tourmaline powders so as to enable their permanent electrodes to be utilized to the maximum. A tourmaline carrier is made up of fine tourmaline powders having a diameter of about 0.3 to 5 microns, esp., about 0.5 to 3 microns and a carrier material for carrying said fine tourmaline powders, said carrier material having a direct-current electrical resistance value or volume resistivity lying in the range of about $10^4$ to $10^8$ $\Omega \cdot$cm, esp., about $10^5$ to $10^7$ $\Omega \cdot$cm.

6 Claims, 5 Drawing Sheets

PERMANENT ELECTRODE CARRIER USING TOURMALINE

This application is a continuation of now abandoned application Ser. No. 08/162,326, filed Dec. 7, 1993.

BACKGROUND OF THE INVENTION

1. Field of the Invention

The present invention relates generally to a tourmaline product and particularly to making use of innumerable permanent electrodes fine powders of tourmaline have. More particularly, the present invention is concerned with a permanent electrode carrier.

2. Prior Art

In 1988, the present inventor has discovered that a tourmaline crystal can maintain a pair of electrodes with no supply of external electric energy, which may be said to be permanent electrodes. This appears to be just tantamount to the permanent magnetic poles of a magnet. In the case of a tourmaline crystal of normal size, some difficulty is involved in measuring or otherwise detecting the nature of these electrodes. The inventor could have casually demonstrated this through some experiments using fine crystals reduced to a size of about 3 microns.

The inventor filed a patent application for this discovery, now laid open for public inspection under JP-A-1-257130 and, with this, put an article about the details in a journal "Solid Physics", Vol. 24–12, 1989. Since then, the inventor has presented some articles in some academia including the Physical Society as well as in some scientific journals. This theory has also be confirmed by experimental researches at national universities and institutions. Products making use of this property of tourmaline are being used in every application, as disclosed typically in JP-A-26449 and JP-A-4-122925, both filed by the inventor. The term "permanent electrode" that corresponds to the permanent poles of a magnet is coined by the inventor. This is because this phenomenon could not have been clarified by conventional physics; in other words, there is no proper term for explaining this phenomenon. What is technically described by this term is now defined in the present disclosure.

In 1925, fifty eight years preceding 1988 in which the inventor discovered this nature of tourmaline, O. Heavside or Dr. Eguchi, Japan, already discovered that when a mixture of a certain molten wax with molten resin is slowly solidified in a direct-current, high electric field, electrostatic charges remain on and in the wax even after field removal, and these residual charges can be maintained over an extended period of time, if they are placed under good conditions. This, because of appearing to correspond to permanent magnets due to magnetism, was called an electret.

Since then, many inorganic and organic dielectric materials have been found to be capable of becoming electrets and numerous studies have been made so as to bring them into practice. These materials must have an electric resistance value of $10^{12}$ Ω·cm or higher. This is because the positive and negative charges are neutralized with time and eventually attenuate. To prepare an electret, a certain substance is heated to set the internal ions or dipoles free. Then, an external direct-current field is applied to the substance for ion migration or dipole orientation. Finally, the substance is cooled and solidified to keep the dielectric substance polarized. Alternatively, an electret may be fabricated by exposing the substance to light or radiation, thereby keeping it in a polarized state where electrons and holes occur instead of ions or dipoles.

At the beginning, the inventor took the permanent electrodes of tourmaline as a kind of electret. This misunderstanding is typically reflected in JP-A-63-222559. However, later studies have indicated that the electric polarization of an electret is quite different from the mechanism of why tourmaline forms electrodes. Set out below are the major reasons.

1. The electrodes of tourmaline can be formed in the absence of any external electric field.

2. At normal temperature the electrodes of tourmaline are not affected by an external electric field.

3. The electrodes of tourmaline are not affected by atmospheric temperature or the presence of water, and so do not attenuate. When placed in water, the electrodes of tourmaline gives rise to the electrolysis of water which is weak but sufficient to generate hydrogen gas and so make an electric current. This phenomenon is substantial evidence of the presence of electrodes, rather than electric poles taking part in electrode decomposition.

4. The electrodes of tourmaline, typically those of schorl, disappear when maintained at high temperatures lying roughly between 950° C. and 1,000° C. Such temperatures show the intensity of energy with which the electrodes of tourmaline are maintained.

5. Most electrets have an electrical resistance of $10^{12}$ Ω·cm or higher. An electret, because of being formed by the electric polarization of dielectric material, will be electrically neutralized easily and disappear, unless it has such a high electrical resistance value. On the other hand, the electrical resistance value of a tourmaline crystal is of the order of $10^{10}$ Ω·cm to $10^{11}$ Ω·cm that are at least two-digit lower than that of a substance forming an electret. Nonetheless, the tourmaline crystal does not lose the property of maintaining electrodes even at high temperatures of 900° C. to 1,000° C. Moreover, the tourmaline crystal electrolyzes water at a voltage lower than its electrolysis voltage to generate hydrogen gas, which is clear evidence of the presence of electrodes.

In view of the facts mentioned above, it is tourmaline which is to be called in the name of electret and tourmaline can be said to be worthy of a permanent electret. However, since the name of electret has already be an established technical term for referring to other substance, it appears to be required that tourmaline be called in another name to avoid terminological confusion or misunderstanding. Moreover, if attention is paid to the fact that the electrodes of tourmaline electrolyze an aqueous electrolyte solution or electrodeposit metal ions from an aqueous metal salt solution, it is considered reasonable to use the term "electrode" for tourmaline, and there will be no fear of that term being confused with the term "electret".

Reference will now be made to how and why the electrodes of tourmaline act. It is first noted that a tourmaline crystal is an ion crystal with the lattice points dislocating from the positions where they are to exist. At present, however, whether such dislocations are due to external or internal reasons in the process of crystal formation is not clarified. In 1880 Pierre Curie and Jacks Curie discovered that the crystal of tourmaline has piezoelectricity. Later, the crystal of tourmaline was also found to have pyroelectricity. Additional studies made by W. C. Röntogen and recent studies made by T. Nakamura, Professor of the University of Tokyo, ret., and now Professor of Tokai University have confirmed that this pyroelectricity of tourmaline is a secondary property caused by crystal distortion due to thermal expansion. As known in the art, the piezoelectricity of tourmaline may give rise to a potential difference in a constant axial direction even under an omnidirectional pressure having no directionality unlike water pressure.

It is not unnatural that tourmaline is a polar crystal member having spontaneous (residual) distortion in its crystal structure, and that a potential difference is considered to have been fixed in a constant axial direction from the beginning. See FIG. 2, in which a stands for the quantity of pyroelecrically electrified charges, b represents a portion having spontaneous charges (making the intensity-voltage of electrodes) corresponding to spontaneous distortion, c denotes spontaneous distortion, d indicates a portion having distortion due to pressure, d' represents the size of distortion corresponding to a, and f stands for the direction of distortion. As a matter of course, this potential difference will not disappear, unless the initial spontaneous distortion responsible for this is removed. The potential difference present within tourmaline transports electrons or charge carriers along it, and the transported electrons are successively stored in the crystal from its one edge, after they have been transported thereto. When external or internal stress is applied to a tourmaline crystal, the crystal lattice distorts in a constant direction, giving rise to charges at the edge of the crystal in this direction. This is called pyroelectricity. Even when the crystal is destressed at this time, the distortion remains intact and this is "residual distortion". A potential difference is generated by charges corresponding to this residual distortion. This potential difference in turn generates driving power, across which two electrodes, anode and cathode, are formed.

The electrons, because of having the same negative charges, repel with each other, making it impossible to exceed a certain density; in other words, the electron density increases from one edge of the crystal axis from which the transportation of electrons starts to the other edge at which the transportation of electrons terminates, so that the electron density can be kept constant at the other edge. Thus, a difference in the density of the electrons stored along the specific crystal axis between both edges of the crystal gives rise to a potential difference (voltage) across the crystal. A portion of the edge of high electron density provides a cathode, while a portion of the edge of low electron density provides an anode. See FIG. 3 wherein e stands for electrons.

The electrodes of tourmaline produced through such a process release electrons in water in which it exists, and accepts electrons as much as the lost electrons, thereby maintaining electrode strength. These electrodes produce an external electric field. This means that a pair of electrodes are present on both ends of tourmaline. The energy for various electrode reactions that they exhibit is not extraneously supplied. As already mentioned, this energy is the (elastic) energy of the distortion stored within tourmaline itself. In the case of schorl, it is only after it is heated to about 950° C. to 1,000° C. that such energy disappears. This phenomenon is analogous to the presence of temperature (Curie temperature) at which the magnetic poles of a magnet disappear, although differing in mechanism.

At normal temperature the electrodes of tourmaline undergo no change, even when an external electric field is applied to it. In other words, these electrodes behave much like what is called permanent electrodes. This energy is made and stored by the spontaneous distortion of the tourmaline crystal lattice. Then, the energy for transporting charge carriers or electrons through the crystal is supplied by the energy of thermal vibration which the lattice vibration—which is now made asymmetrical due to lattice distortion—has at a finite temperature.

Now, how the electrodes of tourmaline can be used will be explained. The electrodes tourmaline can have many practical applications, some fundamental ones of which will be mentioned just below.

1. Fine tourmaline electrodes may be used to electrolyze water at a voltage lower than the electrolytic voltage (of theoretically about 0.7 volts), thereby making surface active water. This fact has already been proven and confirmed by the academic world, and has been well established as Kubo theory.

2. Some positively charged metal ions with the ionization tendency smaller than that of hydrogen receive electrons from the cathode of tourmaline electrodes, so that they can be electrodeposited on the surface of the cathode to form a metal film. The metal deposited on the cathode surface in this manner may be used for various purposes.

3. If fine tourmaline electrodes are brought in contact with the surface of the human body with the use of some suitable means, then minute currents flow on the surface of the body, giving electric stimuli on the nervous systems and sensory receptors. As a result, there are produced electrical signals which can be used directly or through the brain for increased circulation of the blood and other health-care and medical purposes.

4. This novel discovery that tourmaline has substantially unattenuated electrodes is expected to bring forth novel fundamental technologies by future research.

The tourmaline material used in the present invention will now be explained. The tourmaline material is broken down into some types depending on a difference between metal atoms involved in the molecular structure, with the crystals differing in color. Well-colored crystals of good quality have been made much of as jewel rough stones for a long time. Accordingly, abundantly occurring black schorl or other ores are suitable for industrial purposes.

Tourmaline is generally classified into the following two types depending on what state it occurs in.

1. One type is found in pegmatite and can be easily separated and recovered from it with high purity.

2. The other type is small tourmaline ores scattered in skarn that is a sort of metamorphic rock created by the alternation and modification of surrounding rocks due to high-temperature gases and hot water generated in association with the penetration of igneous rock caused by the action of magma. The amount of tourmaline included in skarn is of the order of 3 to 10%. Tourmaline can be used in the form of particles or powders by pulverizing skarn ores.

A carrier for fine tourmaline crystals will now be explained. When fundamental or applied techniques about tourmaline are used in practical applications, pulverized tourmaline ores may be used in particulate, powdery or bulky forms. To enhance the effect of tourmaline and handle it easily, however, it is often preferable to use a tourmaline carrier fabricated by molding a mixture of a fine powder form of tourmaline with other substances. In many cases, the tourmaline crystals used are of a size lying roughly between a few microns and 0.5 microns. One fine crystal electrode on a surface portion of a carrier with fine tourmaline crystals carried on it takes part in electrode reactions only to a small extent. However, it is noted that the number of tourmaline electrodes present on the surface layer of the carrier is extremely numerous. The substance taking part in the reactions occurring in the electrode reaction system produces an effective action among such numerous fine electrodes.

A carrier material for dispersing and fixing such fine tourmaline must have constant conditions. In the electrode reaction carried out by the carrier on which tourmaline having electrodes is carried, the electrodes perform two functions. One function is to feed (cathodes) and receive (anodes) electrons for the reaction. Another function is to provide the interface between the substance (liquid, gas or solid) and the electrodes of tourmaline carried on the carrier in the form of a reaction site in the reaction system, for the purposes of increasing the efficiency of reaction energy, improving the selectivity of the end reaction, and so on.

FIG. 4 is a partly enlarged side section of the carrier on which permanent electrodes are carried according to the present invention. As can be seen from this figure, it is unlikely that a pair of electrodes of a fine tourmaline crystal 1 come simultaneously to the surface layer of a carrier 2. From the standpoint of probability, it is most likely that either one of the positive and negative electrodes comes to the surface of the carrier. In addition, the electrode present on the surface of the carrier is covered on the surface with the substance forming the carrier 2. However, there is a thickness variation. In a system in which the carrier 2 with tourmaline carried on it is used, electrons are fed from the cathode to the substance to undergo the reaction. The electrons, after the electrode reaction has occurred, are accepted by the anode, from which they are immediately transported through the crystal 1 to the cathode for replenishment. In short, the charges carriers or electrons make an electron circulating loop involving feed (cathode)→electrode reaction→(in-system substance)→acceptance (anode)→transportation (through crystal)→replenishment (cathode), whereby electrode energy can be maintained.

In the electron-circulating loop mentioned above, the substance that carries the tourmaline electrodes exists between the substance in the reaction system and the two electrodes. Generally, the carrier 2 belongs to an electrically insulating material. If the electrical resistance value of the carrier 2 should be higher than the electrically insulating resistance value (approximately $5 \times 10^{10}$ $\Omega \cdot cm$) of tourmaline, it would be difficult to transport electrons, resulting in no occurrence of any electrode reaction. To put it another way, there would be an electrically insulated state.

In conclusion, it is required for the occurrence of the electrode reaction that the sum of the electrical resistance values of the carrier 2 present between the individual two tourmaline electrodes and the substance in the reaction system be much smaller than the electrical resistance value of the tourmaline carried in the loop mentioned above. See FIGS. 4 and 6 that are partly enlarged side views of the permanent electrode carriers as well as FIG. 7 that is an electric circuit diagram for illustrating the current flow in the carrier shown in FIG. 6. The electric circuit shown in FIG. 6 is made up of electric circuit components L1 and L2 passing from the crystal 1 of the fine tourmaline powder through a carrier 2 and a substance 3 in the electrical reaction system. As can be seen from FIG. 7, a circuit in a carrier 2 is made up of electrical resistors R1 and R2. Now consider the case where tourmaline having a mean particle size of 3 microns is used, and assume that the inter-electrode distance is again 3 microns. Then, the electrical resistance value of the tourmaline 1 in the longitudinal direction is found to be $(5 \times 10^{10}\ \Omega \cdot cm) \times (3 \times 10^{-4}\ \Omega \cdot cm) = 1.5 \times 10^{7}\ \Omega \cdot cm$ with the proviso that the volume resistance value of a tourmaline crystal is $5 \times 10^{10}\ \Omega \cdot cm$.

On the other hand, assume that the electrical resistance value of the substance forming the carrier 2 is $\alpha \Omega \cdot cm$ and that the sum of the lengths occupied by the carrier substance between the two electrodes of one tourmaline piece and the substance in the system is 1. To transfer electrons by the distance corresponding to this length 1, it is then required that the value given by a $\alpha \times 1$ $\Omega \cdot cm$ be much smaller than the electrical resistance value of each tourmaline piece. If 1 is 10 cm (10 microns), then $\alpha = 10^{7}/1 = 10^{10}\ \Omega \cdot cm$. According to the present invention, a material having a small-enough resistance value lying in the range of $10^{10}\ \Omega \cdot cm/100$ to 10,000 is suitable for the carrier 2. This value varies depending on the particle size and quantity of tourmaline in the carrier. Practically, it is preferable to make a tourmaline carrier and measure the electrode strength, thereby estimating it in relative terms.

Other requirements for the tourmaline carrier will now be explained.

1. The carrier for tourmaline must have a suitable degree of direct-current electrically insulating properties. Materials of good conductivity such as metals cannot be used, because the electrodes per se will disappear.

2. The carrier for tourmaline must have a suitable electrical resistance value. The reason is that, when tourmaline is carried on a material having a resistance value higher than that of a tourmaline crystal (approximately $10^{10}$ to $10^{11}$ $\Omega \cdot cm$), the tourmaline electrodes lose their functions, because it is substantially unlikely that electrons flow, or are transported, between the electrodes in the reaction system due to the presence of the material having such a high resistance value between the substance in the system which undergoes the cathode-anode reaction and the electrodes. In this connection, it is noted that the "electrical resistance value" does not mean only the inherent electrical value of the solid substance forming the carrier. To put it another way, the term "electrical resistance value", when a plurality of solid substances are used in a mixture form, is understood to mean the total of the electrical resistance values of the individual substances.

Mixtures of more than two ceramic materials with tourmaline powders may be granulated and thermally treated to form carriers. In some of these carriers, the grain boundary may provide an electron transporting path, although depending on the electrical properties of the grain boundary. This is even true of when the electrical resistance value of each ceramic material is higher than that of tourmaline. In some cases, "a potential difference is made along the grain boundary", when the electrical resistance value of the portion of the grain boundary is small-enough, or "due to the presence of the grain boundary formed by materials with varying dielectric constants and the electrode surface" —Takagi theory, thereby producing driving power for transporting electrons.

Some materials such as fibrous materials with a high electrical resistance value, when having a high water content due to the presence of internal micropores, may have an electrical resistance value of approximately $10^{7}\ \Omega \cdot cm$ to $10^{8}$ $\Omega \cdot cm$. Preferable examples include rayon, which can be effectively used as a tourmaline carrier. On the other hand, plastics, rubber or coating materials, usually because of having an electrical resistance value as high as $10^{12}\ \Omega \cdot cm$ to $10^{18}\ \Omega \cdot cm$, cannot immediately used as a tourmaline carrier. However, various materials may be used as a tourmaline carrier, if their apparent electrical resistance values are reduced by incorporating in them slight quantities of materials of good conductivity such as carbon black, graphite, metals, metallic compounds or semiconductor materials.

The size and quantity of tourmaline powders to be used with the tourmaline carrier may be determined with the following conditions in mind.

Tourmaline has a Mohs hardness of about 7.5. Tourmaline material having such hardness is finely divided by dry pulverization techniques. In view of economical considerations, the lower limit of particle size is a mean particle size of about 3 microns. Much lower particle size must rely on classification or wet pulverization, resulting in some considerable increase in the pulverization cost. Tourmaline material, when carried on ceramics, coating materials, plastics or the like, may have a mean particle size of about 3 microns due to their relatively large size and thickness.

In most cases, commercially available products are used for fibrous or rubber carrier materials. To maintain the mechanical strength of a commercial product, powdery tourmaline used with it must be small enough in size; that is, powdery tourmaline must be reduced to about 1 to 0.3 microns by wet pulverization.

MEASUREMENT OF THE INTENSITY OF THE ELECTRODIC ACTION THAT TOURMALINE ORES AND POWDERY MATERIALS., ETC., AS WELL AS VARIOUS CARRIERS

It is important to learn whether or not tourmaline ores and various carrier materials have electrodic action and the intensity of the electrodic action, when they have. Without knowing these, it is impossible to learn the intensity of the electrodes that a tourmaline ore has. Nor is it possible to learn what type of tourmaline is to be used as well as a difference in electrode strength between tourmaline carrier materials. These are required not only to know the effect and performance of various commercial products made using tourmaline but also to develop, make, inspect and manage such commercial products.

Electrodic action may be measured as follows. Innumerable tourmaline electrodes give rise to electrode reactions with a substance in a reaction system. When placed in an aqueous solution of hydrochloric acid regulated to pH 3.0, fine electrodes of tourmaline electrolyze this. Of the resulting ionic species, $H^+$ ions are easily removed from the aqueous solution in the form of $H_2$ (hydrogen gas). Upon the $H^+$ ions converted to H, the pH value representing hydrogen ion concentration increases from 3.0. $Cl^-$ ions become $Cl_2$ and HOCl at pH 3; that is, Cl is less likely to be present in an ionic state. Also, a reduction in the ionic species brings about a specific conductivity drop. The pH values or the logarithmic values of specific conductivity (25° C.) are measured with time for graphical representation.

As can be seen from FIG. 5, the "pH value" and the "change in the logarithmic value of specific conductivity" are represented by a straight line broken into two portions. At the initial stage A the electrodes (cathodes) of tourmaline 1 release electrons much like an avalanche, and at the subsequent stage B electrons flows at a constant speed. The inclination of A is variable at random, but the inclination of B remains constant. This inclination of B is proportional to the speed at which $H^+$ ions are neutralized by electrons fed from the cathodes. Thus, it is reasonable to consider that the speeds of increases and decreases in the pH value or the logarithmic value of specific conductivity at time 0 at which an extension of B intersects the ordinate is proportional to the intensity of the electrode reaction. The magnitude of this change is used as the value for relative comparison of electrode strength.

A primary object of the present invention is to provide a permanent electrode carrier making use of tourmaline, which is designed while taking the size of fine tourmaline powders and the direct-current electrical resistance value of the carrier, so that a slight yet practical-enough current can flow between innumerable fine electrodes of a tourmaline crystal.

SUMMARY OF THE INVENTION

According to one aspect of the present invention, there is provided a permanent electrode carrier making use of tourmaline, which is made up of fine tourmaline powders having a diameter of about 0.3 to 5 microns, esp., about 0.5 to 3 microns and a carrier material for carrying said fine tourmaline powders, said carrier material having a direct-current electrical resistance value or volume resistivity lying in the range of about $10^4$ to $10^8$ Ω·cm, esp., about $10^5$ to $10^7$ Ω·cm.

According to another aspect of the invention, there is provided a permanent electrode carrier making use of tourmaline, which is made up of fine tourmaline powders having a diameter of about 0.3 to 5 microns, esp., about 0.5 to 3 microns and a carrier material for carrying said fine tourmaline powders, said carrier material comprising a mixture of a plurality of substances and having a direct-current electrical resistance value or volume resistivity lying in the range of about $10^4$ to $10^8$ Ω·cm, esp., about $10^5$ to $10^7$ Ω·cm.

According to a further aspect of the invention, there is provided a permanent electrode carrier making use of tourmaline, which is made up of fine tourmaline powders having a diameter of about 0.3 to 5 microns, esp., about 0.5 to 3 microns and a carrier material for carrying said fine tourmaline powders, said carrier material being formed of a fibrous material having a high official water content, and having a direct-current electrical resistance value or volume resistivity lying in the range of about $10^4$ to $10^8$ Ω·cm, esp., about $10^5$ to $10^7$ Ωcm.

According to a still further aspect of the invention, there is provided a permanent electrode carrier making use of tourmaline, which is made up of fine tourmaline powders having a diameter of about 0.3 to 5 microns, esp., about 0.5 to 3 microns and a ceramic carrier material in which the grain boundaries of ceramic crystals have the property of transporting electrons due to their electrical properties.

According to a still further aspect of the invention, there is provided a permanent electrode carrier making use of tourmaline, which is made up of fine tourmaline powders having a diameter of about 0.3 to 5 microns, esp., about 0.5 to 3 microns and a carrier material for carrying said fine tourmaline powders, said carrier material being obtained by mixing a substance of high electrical-insulating properties such as plastic or rubber with powders of a substance of good conductivity such as carbon black, graphite or a metal, and having a direct-current electrical resistance value or volume resistivity lying in the range of about $10^4$ to $10^8$ Ω·cm, esp., about $10^5$ to $10^7$ Ω·cm.

With the tourmaline carrier recited in claim 1, it is possible to achieve an effective electrode action, because the fine powders of tourmaline have a diameter of about 0.3 to 5 microns, esp., about 0.5 to 3 microns. It is also possible to keep an electron-transporting route taking part in the electrode reaction under satisfactory conditions, because the carrier has an electrical resistance value of about $10^4$ to $10^8$ Ω·cm, esp., about $10^5$ to $10^7$ Ω·cm.

The tourmaline carrier recited in claim 2 is made up of a plurality of substances but, nonetheless, shows action similar to that achieved by use of a single substance.

The tourmaline carrier recited in claim 3 has a suitable electrical resistance value due to hygroscopicity, because it is made up of a substance having a high water content such as fibers which have micropores connected with each other and so have a high water content.

With the tourmaline carrier recited in claim 4, it is possible to keep an electron-transporting route under satisfactory conditions, because it is made up of an electron-transporting substance in which electrons are transported by the electrical properties of the grain boundaries of the crystals.

The tourmaline carrier recited in claim 5 has a satisfactory electrical resistance value, because it is made up of a mixture of a high electrical insulating substance such as plastics or rubber with powders of good conductivity such as those of carbon black, graphite or metals.

EXAMPLES

The present invention will now be explained at great length with reference to some examples.

Example 1

This example is directed to a spherical ceramic carrier with tourmaline carried on it.

Schorl from Brazil was reduced to a mean particle size of 3 microns. The powders have a schorl content of approximately 95% or more. Impurities deposited on the crystals were primarily mica, feldspar, etc. A feed batch containing such schorl powders and having the following composition was mixed, granulated, heated, maintained at 950° C. for 3 hours, sintered, and slowly cooled. After sintering, the spherical products were placed in a laterally arranged, cylindrical container such as a ball mill together with water, where they were rotated for roughly 20 minutes to finish their surfaces by grinding. The thus ground products were well washed with water, and then spontaneously dried at normal temperature. Set out below is the composition of the feed batch.

| Composition | parts |
|---|---|
| a. Schorl powders (from Brazil), 3 microns: | 10 |
| b. Activated alumina ( Corp.), 0.3 microns: | 40 |
| c. Borosilicate glass (Asahi Glass Co., Ltd.), 3 microns: | 40 |
| d. (Commercial) clay sintering aid: | 10 |
| Total: | 100 |

Figure 5:
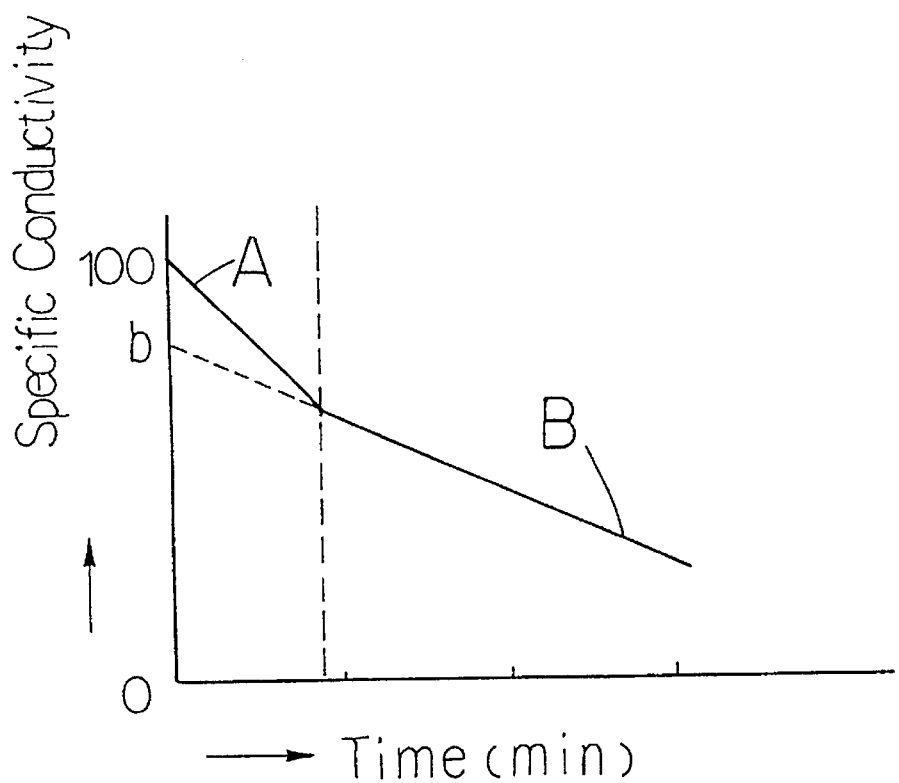
FIG. 5 is a representation showing the relation between time and the logarithmic value of specific conductivity of the permanent electrode in an aqueous hydrochloric acid solution (pH 3).
Figure 6:
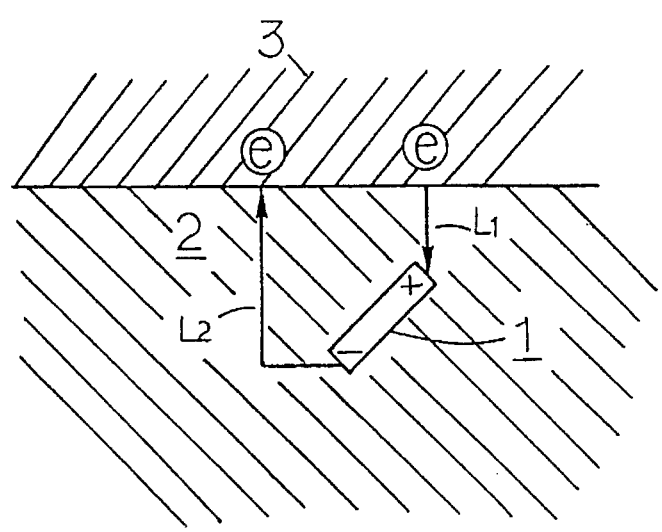
FIG. 6 is a circuit representation of how an electric current flows from the permanent electrode of tourmaline through the carrier.
Figure 7:
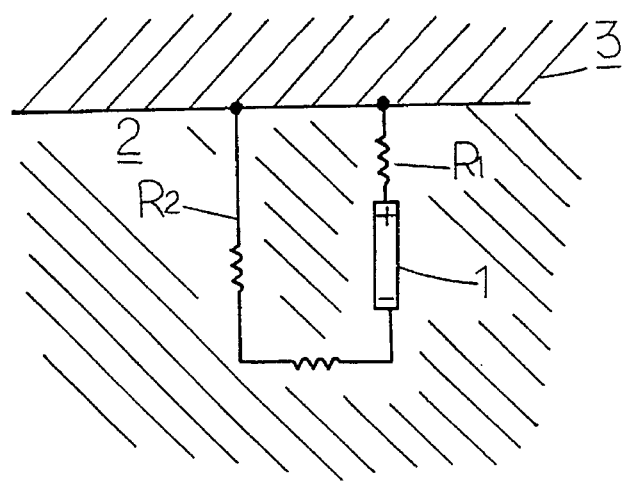
FIG. 7 is an electric circuit representation for illustrating the flow of electricity in FIG. 6.

The spheres were regulated to a mean diameter of roughly 3.5 mm during granulation. One hundred (100) g of the ceramic spheres with tourmaline carried on them were placed on the bottom of a 1-liter beaker containing 900 cc of an aqueous solution of hydrochloric acid (pH 3), while the solution was stirred. Over a period of 30 minutes the pH value and the logarithmic value of specific conductivity were measured and recorded. The changes in the pH value and specific conductivity are due to the electrode reaction of tourmaline, and the speed of the change representing the inclination of the line (i.e., the line at the stage B shown in FIG. 5) is an index to the intensity of the electrode reaction.

In another experiment, activated alumina having a large mean particle size of 3 microns was used in place of that having a mean particle size of 0.3 microns. As a result, the value representing the above intensity of the electrode reaction was roughly reduced by half. This appears to be due to a reduction in the number of electron-transporting paths and an associated increase in electrical resistance. Electrode strength may be measured by various methods depending on the geometry, etc., of the object to be measured, but on the same fundamental principles. The initial pH value may be 3.5 rather than 3.0, and so is selected while consideration is taken into the conditions under which measurements can be easily compared with each other. The tools used are an aqueous solution stirrer, a pH meter, a specific conductivity meter, a thermometer (for measuring water temperature), and so on. If the quantity of the object to be measured and the initial pH value and quantity of the aqueous solution are kept constant, it is then easy to compare measurements.

Both alumina and silica have an electrical resistance of $10^{12}$ to $10^{13}$ $\Omega$·cm or more, which are higher than that of tourmaline. The interiors of sintered crystal spheres of alumina and a silica compound, because of having a high electrical resistance value, cannot provide electron transporting paths. In other words, the electron transporting paths are then provided by the "grain boundaries" of these crystals. It is here noted that there is a large difference in dielectric constant between alumina (9.0) and the silica compound (ca. 3.5). When grain boundaries with varying dielectric constants are in contact with the surfaces of electrodes, a potential difference is generated along these grain boundaries, as already taught by Takagi theory. This potential difference becomes power for driving electrons.

Example 2—Fibers with Tourmaline Crystals Carried on Them

Fibers with tourmaline crystals carried on them are broken down into two types depending on a difference in how to carry the crystals on them.

A). One type is regenerated cellulose fibers such as rayon or chemical synthetic fibers. For instance, rayon is first liquefied by heating. Then, a given batch of 1 to 0.5 μ fine tourmaline powders (0.2 to 10% by weight on solid basis) is incorporated and dispersed in the liquid nylon, followed by raw cotton making in ordinary manners. This raw cotton is spun into yarn. This yarn is mixed with other yarns for fabric making. Unwoven fabric may also be prepared as usual.

B) Another type is the rest. For instance, use may be made of various fibers or fibrous products. Fine powders of tourmaline are first mixed with and dispersed in an urethane or acrylic liquid binder together with the fibers, thereby depositing a suitable amount of tourmaline onto the surfaces of the fibers. Then, the solvent is separated from the fibers and evaporated off. This procedure is called "post-processing".

A rayon solution was obtained from a certain rayon maker. Fine powders of tourmaline were incorporated and dispersed in this rayon solution at a solid basis of 3%. The obtained raw cotton was used to prepare yarn made up of long fibers of 10 cm on the average. This yarn, which may be used to make various fabrics, was immediately used for measuring purposes.

Measurement was done as follows.

1. An aqueous solution of hydrochloric acid (regulated to pH 3, 900 cc) was put in a 1000 cc beaker while it was kept stirred with the use of an agitator and a stirrer.

2. A cylindrical member of 80 mm in diameter and 80 mm in height was built up of a network made of stainless wires of 2.0 mm in diameter, and the rayon yarn of 3 meter in the total length was then wound around this member at intervals made as equidistant as possible. Finally, both ends of the yarn were tightly fixed.

3. The cylindrical member provided as mentioned in 2 was immersed in the aqueous solution (of ca. pH 3) of hydrochloric acid kept stirred in the beaker.

4. With the lapse of time, the pH value and the logarithmic value of specific conductivity of the solution were measured at 25° C. and recorded.

5. These measurements were obtained over a period of 30 minutes. The results are set out in the following table, which indicates that the electrodes of the tourmaline incorporated in the rayon give rise to electrode reactions in the aqueous solution and teaches the intensity of such reactions.

| Time min. | pH | Specific Cond. μs/cm | Calculated at 25° C., × 1.12 | % | Water Temp. °C. |
|---|---|---|---|---|---|
| 0 | 3.0 | 460 | 520 | 100 | 20 |
| 0.5 | 3.1 | 480 | 540 | 100 | 20 |
| 1 | 3.1 | 450 | 500 | 96 | 20 |
| 2 | 3.1 | 440 | 490 | 94 | 20 |
| 3 | 3.1 | 430 | 480 | 92 | 20 |
| 4 | 3.2 | 420 | 470 | 90 | 20 |
| 5 | 3.2 | 410 | 460 | 88 | 20 |
| 6 | 3.2 | 400 | 450 | 87 | 20 |
| 8 | 3.2 | 380 | 430 | 83 | 20 |
| 10 | 3.3 | 370 | 410 | 79 | 20 |
| 12 | 3.3 | 350 | 390 | 75 | 20 |
| 15 | 3.3 | 340 | 380 | 73 | 20 |
| 20 | 3.4 | 320 | 360 | 69 | 20 |
| 25 | 3.4 | 310 | 350 | 67 | 20 |
| 30 | 3.5 | 290 | 320 | 62 | 20 |

These measurements can be obtained on the same principles and bases but, in some cases, minor modifications must be made with the material and geometry of the carrier in mind.

In another experimentation, 30% of rayon yarn (of ca. 10 microns in thickness) with 3% (on dry basis) of fine tourmaline powders (of 0.5 microns on the average) incorporated in it was blended with 70% of polyester yarn to make fabric. This fabric of a 12 cm×30 cm size was used to measure the intensity of electrode reactions (called "electrode titer"). For measurement, the procedure for the first experimentation was followed with the exception that an aqueous solution of hydrochloric acid regulated to pH 3 was put in a 500 cc beaker and the fabric was wound on an exclusive stainless net cylinder for immersion in the aqueous solution. The results are set out in the following table, which reveals that the tourmaline incorporated in the fabric achieves electrode reactions.

DATA MEASURED ON ELECTRODE TITERS (WITH A FABRIC AREA OF 300 cm$^2$)

| Time min. | pH | Specific Cond., calculated at 25° C., μs/cm | % | Water Temp. °C. |
|---|---|---|---|---|
| 0 | 3.0 | 580 | 100 | 20 |
| 0.5 | 3.0 | 560 | 97 | 20 |
| 1 | 3.1 | 540 | 93 | 20 |
| 2 | 3.1 | 520 | 90 | 20 |
| 3 | 3.1 | 500 | 86 | 20 |
| 4 | 3.1 | 500 | 86 | 20 |
| 5 | 3.1 | 500 | 86 | 20 |
| 6 | 3.2 | 490 | 84 | 20 |
| 8 | 3.2 | 490 | 84 | 20 |
| 10 | 3.2 | 490 | 84 | 20 |
| 12 | 3.2 | 490 | 84 | 20 |
| 15 | 3.2 | 490 | 84 | 20 |
| 20 | 3.4 | 490 | 84 | 20 |
| 25 | 3.2 | 490 | 84 | 20 |
| 30 | 3.2 | 490 | 84 | 20 |

Here the "electrical stimuli in the living body" will be explained. First, electrical signals (pulses) and nervous action will be referred to. The form, thickness, surface state, etc., of an object can be visualized by the act or faculty of "seeing". Like hardness, however, they can also be rapidly envisioned by the act or faculty of "touching". Many nerves are spread over the surface of the skin including the tip of a finger. These nerves are made up of cells called "neurons". The initial one end of the nerve cells leads to "sensory receptors" present on the surface layer of the skin. The nerve cells are linked together, with the terminating one end leading to the brain by way of the central nervous system. The sensory receptors for the sense of touch—that are pressure and temperature sensors—enable pressure and temperature changes to be converted into electrical signals.

Figure 8:
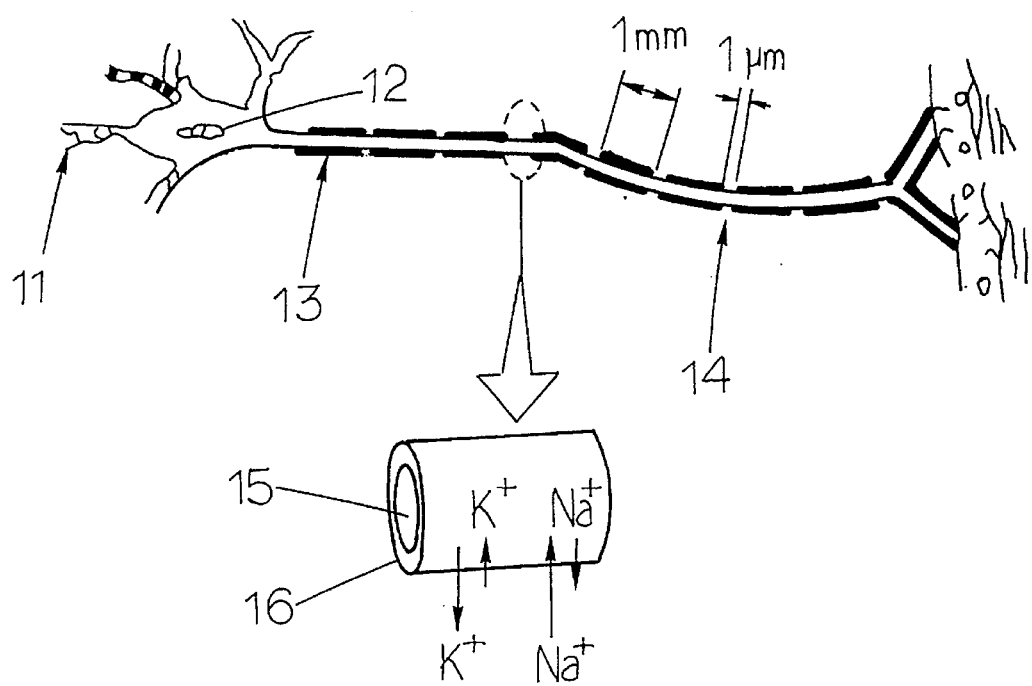
FIG. 8 is a schematic of a medullated nerve.
Figure 9:
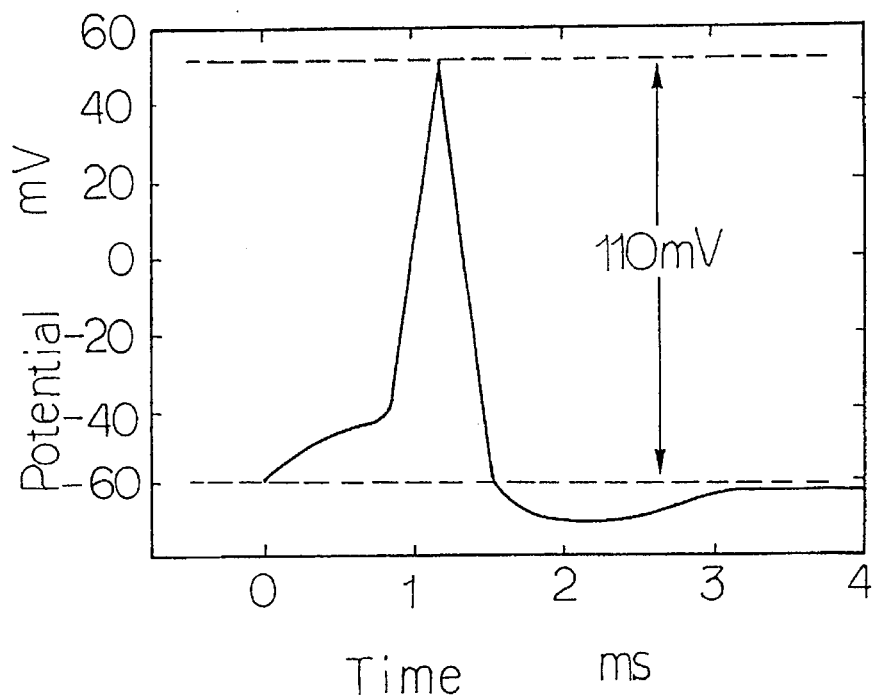
FIG. 9 is a representation of a change in membrane potential due to current stimuli.

The electrical signals in turn cause a change in the transmembrane potential difference (membrane potential) of each nerve cell. This membrane potential change is an electrical transition phenomenon of ca. 1 ms ($\frac{1}{1000}$ second). This mechanism is common to every sense inclusive of sight, the taste and the smell, to say nothing of the sense of touch. Thus, information transmission through the nervous network is carried out by electrical pulses. FIG. 8 is a schematic of a medullated nerve, wherein 11 stands for a dendrite, 12 a nidus, 13 a myelin sheath, 14, 15 an axoplasma, and 16 an axon membrane, and FIG. 9 is a representation of a change in membrane potential due to stimuli caused by a current flowing from within the axon. See H. Matsumoto "Phenomenon and Substance of Nervous Excitation (Volume One)—One example of impulse generated in the meganerve of a squid".

In what follows, nervous currents will be explained. In 1791, Galvani, an Italian biologist, learned that during the anatomical experiment of a frog, the lower limbs move simultaneously with the surrounding discharge. This was the first to discover an electric current, and provided an opportunity to clarify the nervous current. The phenomenon found in the frog is the same as being referred to as an electric stimulus.

At present, the world is replete with the word "electricity", and people, because of being too familiar to that word, think of nothing about what is electricity. For instance, it is most unlikely that people have an understanding of such words as electricity, voltage, electric currents, electric fields, and electrons. The same holds for the electrical stimulus. Why do we feel an electrical stimulus? Is this due to voltage and electric fields? On the other hand, sparrows perching on high-tension wires or those who stand still just below high-tension wires will not receive anything stimulative. Why is this? If someone clasps an electrode of 100 volts, then he or she will be killed instantaneously. People often receive a sharp stimulus upon clasping the doorknob, and this is due to an electric current flowing through the skin. Only by application of voltage are electrical stimuli unlikely to occur, and this is even true of no matter how high voltage is applied. It is only after electric currents flow through the living body that such a phenomenon takes place. Precisely speaking, this cannot take place with no flow of electrons that are electrified substances.

So far and for convenience, a flow of electrons has been called an electric current. However, since charges carried by electrons were determined to be minus in 1873 by Maxwell, a flow of electricity is counter to a flow of electrons. A flow of electrons through an electrical conductor such as a metal is called a flow of electricity, and a flow of electrons through vacuum or the air is called electric discharge. Electrical stimuli are caused by an electric current (electrons) passing through the living body, rather than by voltage (an electric field). Voltage (an electric field) has potential energy, but it cannot provide an electrical action tantamount to an electrical stimulus to the living body without being converted to actual energy.

Here why fine tourmaline electrodes are capable of producing electrical stimuli will be explained. As already mentioned, fine crystal powders of tourmaline having electrodes may be carried on particulate ceramics, fibers, etc., to make various tourmaline carriers. With such a tourmaline carrier coming into contact or engagement with the surface of the skin of the human body, very minute currents flow through the electrically conductive surface layer portion of the skin containing body fluids by way of the innumerable fine electrodes of tourmaline. To put in another way, substance charged with electricity—that are called electrons—pass through the living body. As these electrons move their way through the body fluids or various substances, they give rise to electrical reactions due to charges, and the generation of Joule heat. On the surface layer of the skin of the living body there are innumerable blood capillaries, network nerves and sensory receptors. Sites called "tender points" or "therapeutic points" are places where these exist and function specifically.

On the presence and role of sensory receptors, there is a common medical view both in the West and the East, although it is differently described. That is, diverse sensory stimuli received there are transmitted by way of nerve cells to the brain in the form of information, which in turn enables various commands to be issued to the internal organs and sites of the living body. Of importance here is that every sense received by sensory receptors, regardless of type, is converted to electrical signals for transmission. Thus, it is a matter of course that stimuli by currents are the most intermediate ones that are all converted directly to electrical signals, giving electrical stimuli. This is the reason that minute electric currents produced on the surface of the skin by fine tourmaline electrodes make a gentle yet great contribution to a continuous medical and health-care effect due to the combination of their minuteness with their capability to make innumerable local currents.

Figure 10:
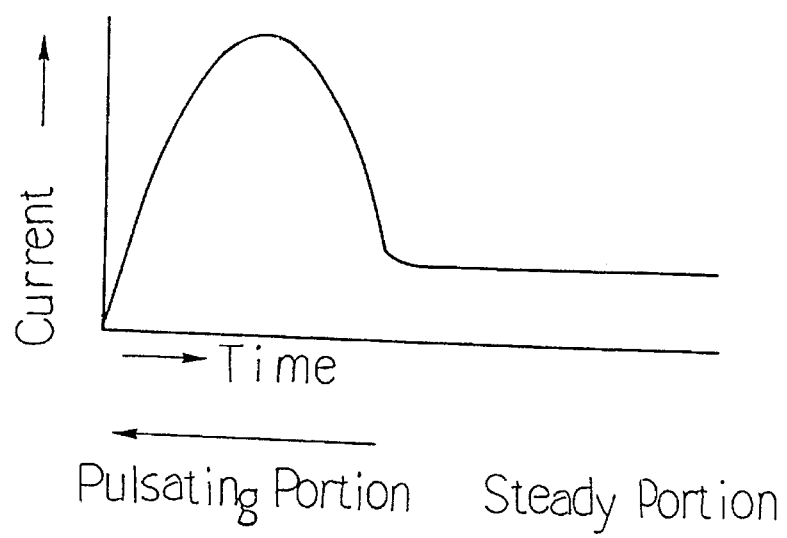
FIG. 10 is a representation of the progress of the electrolysis of an aqueous solution by fine crystals of tourmaline.

Then, pulsating and steady currents made by fine tourmaline electrodes will be explained. As the progress of the electrolysis of an aqueous electrolyte solution using fine tourmaline electrodes is measured with time, an interesting fact is found. Within an initial short period of time (30 seconds) there is a drastic release of electrons, which are consumed for the neutralization of hydrogen ions. Subsequently, a slow release of electrons is indefinitely continued at a constant speed. The same will have occurred on the surface of the skin. FIG. 10 is a current vs. time plot in which the progress of the electrolysis of water by fine tourmaline crystals is illustrated with time. Pulses are initially formed by a strong current, followed by a weak current. This pattern is common to those found in the case of therapies applied to the surface of the skin and the tender points such as moxa cautery, a finger-pressure therapy, and acupuncture. Probably, this is significant for medical treatments.

Figure 1:
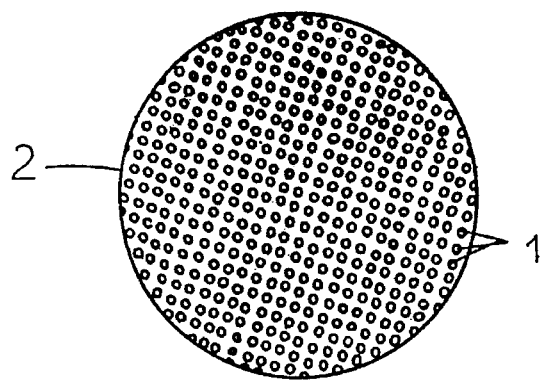
FIG. 1 is a front view of one embodiment of the permanent electrode carrier making use of tourmaline according to the invention.
Figure 2:
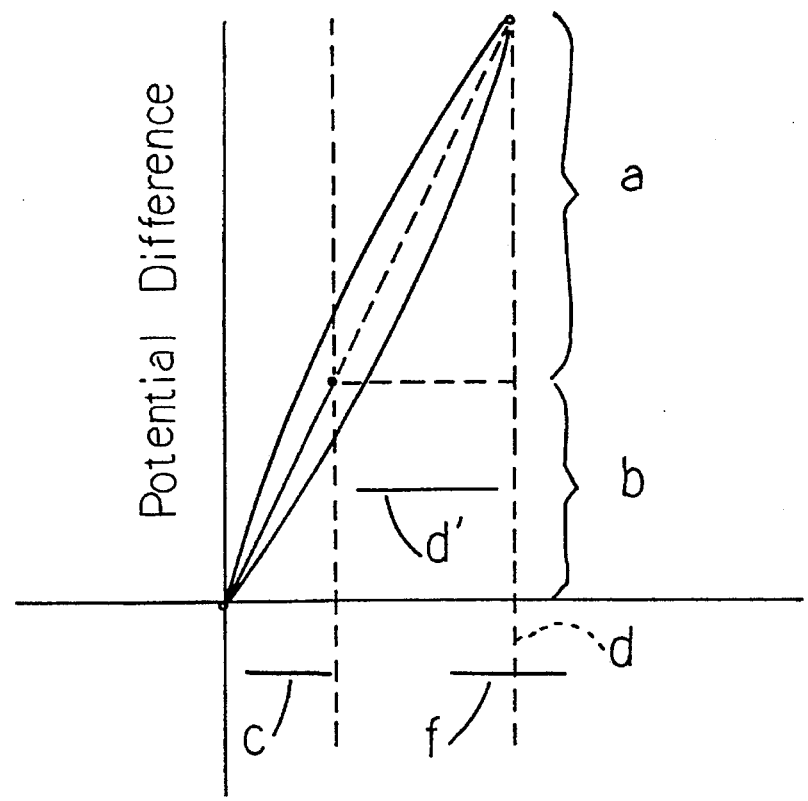
FIG. 2 is a representation showing the relation between dislocations of the lattice points of tourmaline and a permanent electrode.
Figure 3:
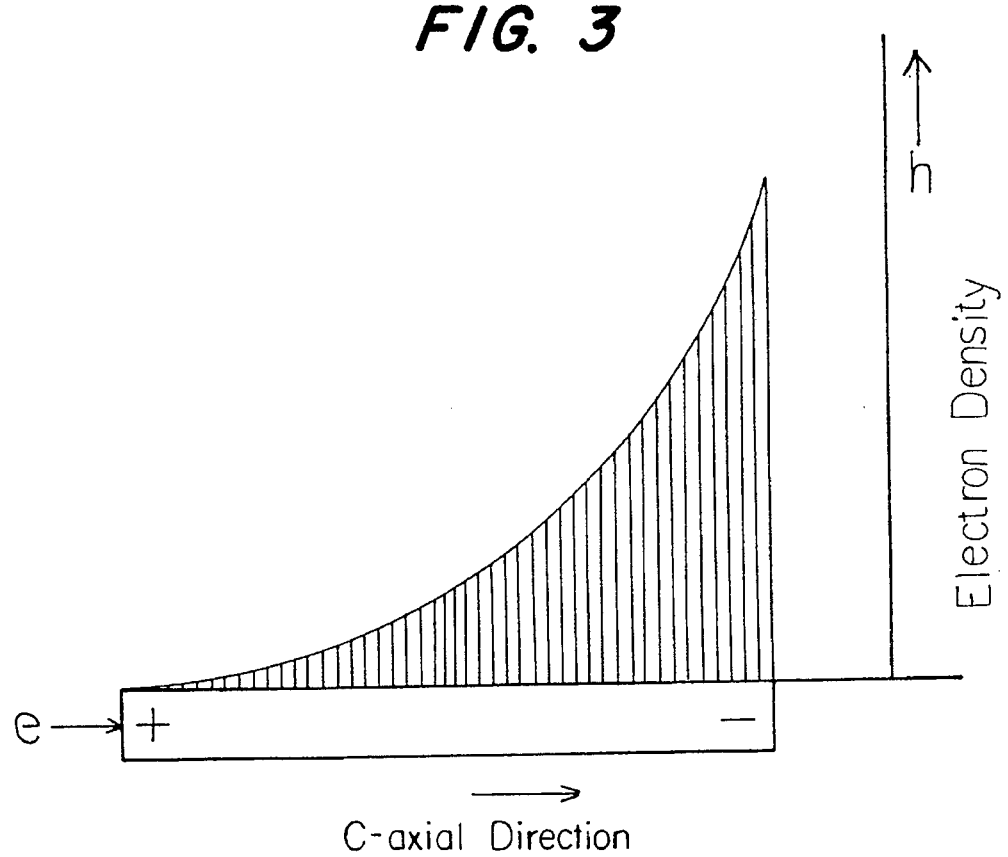
FIG. 3 is a representation showing the permanent electrode of tourmaline and the height of electron density.
Figure 4:
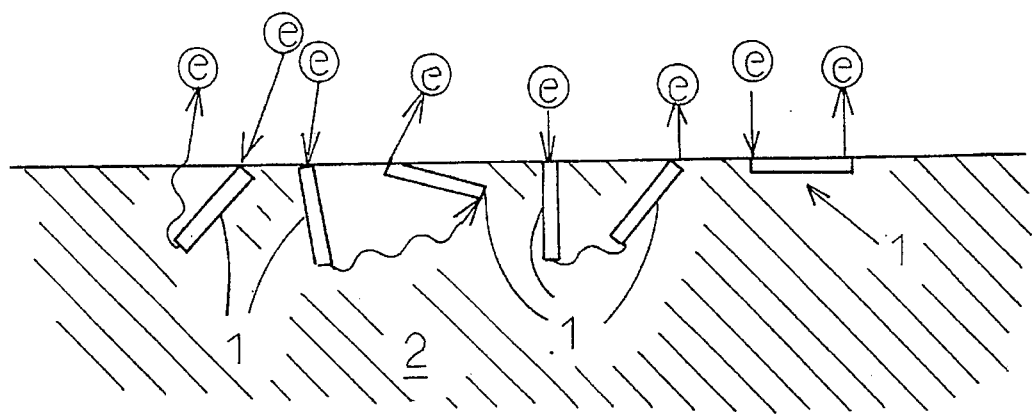
FIG. 4 is a partly enlarged side section of the carrier shown in FIG. 1.

Finally, the conditions needed for the substance to carry fine tourmaline powders will be explained. Where electrode reactions are carried out by a tourmaline carrier (e.g., one shown at 2 in FIG. 4) is the interfaces between a substance (liquid, gas or solid) in the reaction system and the electrodes of tourmaline. Through the interfaces electrons are fed from the cathodes to the anodic surfaces, producing a flow of electrons. The electrical resistance value of a tourmaline crystal (e.g., one shown at 1 in FIG. 4) between one cathodic surface for feeding electrons and one anodic surface for receiving electrons and along this flow path, i.e., that of the carrier between one interface and one electrode, must be about $1/10$ to $1/100$ lower than that of the tourmaline crystal given by $(5\times10^{12}\ \Omega\cdot cm)\times$(electrode length $\alpha\cdot\mu$). When this value is larger than the electrical resistance value of the tourmaline crystal, there is no or little current; no electrode reaction is found with adjacent electrodes remaining insulated.

From the standpoint of probability, it is most likely that only ones of pairs of positive and negative electrodes of the fine crystal of tourmaline come to the surface layer of the carrier on which the fine crystal is carried. To effect electrode reactions with the use of such a tourmaline carrier, it is required that within the reaction system in which the carrier exists, electrons be fed from one electrodes (cathodes) through the surface of the carrier to the substance present in the system, and some electrons taking part in the electrode reactions are received by the anodes with the opposite sign and transported back to the original cathodes by the potential prevailing in the crystal. By allowing charge carriers or electrons to circulate through a loop defined by electron feeding (to cathodes)→electron feeding (into reaction system)→electron feeding (to anodes)→electron transportation (through crystal), the electrode energy of the tourmaline crystal can be maintained.

For further reference, set out below are the official water contents in % of fibers set forth in "Scientific Handbook On Consumption of Fibrous Product" edited by Nippon Seni Seihin Shohi Kagaku Gakkai and published by Koseikan.

| WATER CONTENTS OF FIBERS AND FIBROUS PRODUCTS AT VARYING TEMPERATURES | |
| --- | --- |
| Fibers | Water Content, % |
| Cotton | 8.5 |
| Flax | 12.0 |
| Wool | 15.0 |
| Silk | 11.0 |

| WATER CONTENTS OF FIBERS AND FIBROUS PRODUCTS AT VARYING TEMPERATURES | |
|---|---|
| Fibers | Water Content, % |
| Rayon | 11.0 |
| Cuprammonium rayon | 11.0 |
| Acetate | 6.5 |
| Triacetate | 3.5 |
| Promix | 5.0 |
| Nylon | 1.5 |
| Polyester | 2.0 |
| Acryl | 2.0 |
| Vinylidene | 0 |
| Polyethylene | 0 |
| Polypropylene | 0 |
| Polyurethane | 0.1 |
|  | 1.0 |
| Benzoate | 0.4 |
| Aromatic nylon | 4.5 |
| Fluorine fiber | 0 |

| WATER CONTENTS OF VARIOUS FIBERS, % | | | |
|---|---|---|---|
| Fibers | 20% R.H. | 65% R.H. | 95% R.H. |
| Cotton |  | 7 | 24–27 |
| Flax |  | 7–10 | 23–31 (100%) |
| Wool |  | 16 | 22 |
| Silk |  | 9 | 36–39 (100%) |
| Rayon | 4.5–6.5 | 12.0–14.0 | 25.0–30.0 |
| Cuprammonium rayon | 4.0–4.5 | 10.5–12.0 | 21.0–25 |
| Acetate | 1.2–2.4 | 6.0–7.0 | 10.0–11.0 |
| Triacetate |  | 3.0–4.0 | 8.8 |
| Promix | 2.0–4.0 | 4.5–5.5 | 8.0–9.0 |
| Nylon | 1.0–1.8 | 3.5–5.0 | 8.0–9.0 |
| Polyester | 0.1–0.3 | 0.4–0.5 | 0.6–0.7 |
| Acryl | 0.3–0.5 | 1.2–2.0 | 1.5–3.0 |
| Acrylic | 0.1–0.3 | 0.6–1.0 | 1.0–1.5 |
| Vinylon | 1.2–1.8 | 3.5–5.0 | 10.0–12.0 |
| Polyvinyl chloride | 0 | 0 | 0–0.3 |
| Vinylidene | 0 | 0 | 0–0.1 |
| Polyethylene | 0 | 0 | 0–0.1 |
| Polypropylene | 0 | 0 | 0–0.1 |
|  | 1.6–2.1 | 2.5–3.5 | 5.3–6.6 |
| Benzoate | 0.1–0.3 | 0.4–0.5 | 0.6–0.7 |
| Aromatic nylon | 2.5–3.0 | 4.0–5.5 | 7.0–8.0 |
| Fluorine fiber | 0 | 0 | 0 |

The present permanent electrode carrier using tourmaline makes a great contribution to the art. For the carrier with that can be selected in terms of geometry, many materials may be used depending on what purpose it is used for. With this tourmaline carrier, it is possible to achieve effective electrode reactions with the substance involved.

The present invention enables fine crystals of tourmaline to be used and handled very easily.

In addition, the present invention makes it possible to recycle the tourmaline carrier by making use of ceramic spheres. For instance, the ceramic spheres with tourmaline carried on them may be mutually ground in water to scrape off metals, etc., deposited on the surfaces of the electrodes for re-electrodeposition or reuse for other purposes.

What is claimed is:

1. A fabric formed from a plurality of yarns, wherein at least a portion of said plurality of yarns contains fine tourmaline powders having a diameter of about 0.3 to 5 microns.

2. The fabric according to claim 1 wherein the fine tourmaline powders are incorporated and dispersed within said yarns.

3. The fabric according to claim 2 wherein the fine tourmaline powders are contained in an amount of 0.2 to 10% by weight in said yarns.

4. The yarn according to claim 3 wherein the fine tourmaline powders have a diameter of 0.5 to 1 microns.

5. The yarn according to claim 1, wherein the fine tourmaline powders are adhered to a surface of said yarns.

6. The fabric according to claim 1, wherein said yarn portions have a resistivity in the range of about $10^4$ to $10^8$ $\Omega \cdot cm$.

* * * * *